(12) United States Patent
Lee (10) Patent No.: US 11,994,393 B2
(45) Date of Patent: May 28, 2024

(54) DEVICE AND METHOD FOR TRACKING AIR CARGO

(71) Applicant: AMOSENSE CO., LTD, Cheonan-si (KR)

(72) Inventor: Sangyeoll Lee, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 415 days.

(21) Appl. No.: 17/413,303

(22) PCT Filed: Dec. 12, 2019

(86) PCT No.: PCT/KR2019/017614
§ 371 (c)(1),
(2) Date: Jun. 11, 2021

(87) PCT Pub. No.: WO2020/122644
PCT Pub. Date: Jun. 18, 2020

(65) Prior Publication Data
US 2022/0065631 A1     Mar. 3, 2022

(30) Foreign Application Priority Data
Dec. 12, 2018    (KR) .................. 10-2018-0159684

(51) Int. Cl.
*G01C 21/20*    (2006.01)
*G06Q 10/08*    (2023.01)
(Continued)

(52) U.S. Cl.
CPC .......... *G01C 21/206* (2013.01); *G06Q 10/08* (2013.01); *G16Y 10/75* (2020.01); *G16Y 40/60* (2020.01)

(58) Field of Classification Search
CPC ...... G01C 21/206; G06Q 50/28; G16Y 10/75; G16Y 40/60
See application file for complete search history.

(56) References Cited

U.S. PATENT DOCUMENTS 6,281,797 B1 *    8/2001    Forster .................. G01S 5/0018
                                              340/8.1
9,501,920 B2 *   11/2016    Harring .................. G08B 21/18
(Continued)

FOREIGN PATENT DOCUMENTS

JP    2014-015295 A    1/2014
KR    10-2003-0022107 A    3/2003
(Continued)

*Primary Examiner* — Elias Desta
(74) *Attorney, Agent, or Firm* — Maschoff Brennan (57) ABSTRACT

Provided are a device and a method for tracking air cargo that determine whether air cargo is loaded on the basis of sensing values of a pressure sensor and an accelerometer, and switch to a flight mode when the loading is completed to block communication with an external device. The provided device for tracking air cargo detects acceleration information and pressure information according to the movement of the air cargo, generates tracking information of the air cargo on the acceleration information and the pressure information, transmits the tracking information to an external device, and switches to a flight mode on the basis of one of the acceleration information, the pressure information, and whether a communication signal is received.

17 Claims, 9 Drawing Sheets

(51) Int. Cl.
*G16Y 10/75* (2020.01)
*G16Y 40/60* (2020.01)

(56) References Cited

U.S. PATENT DOCUMENTS 9,652,912 B2 * 5/2017 Fadell ...................... G07C 9/27
9,940,491 B2 * 4/2018 Lim ...................... E05B 45/005

FOREIGN PATENT DOCUMENTS

| KR | 10-2011-0091916 A | 8/2011 |
| KR | 10-2015-0037777 A | 4/2015 |
| WO | 2004/069702 A1 | 5/2006 |

* cited by examiner

DEVICE AND METHOD FOR TRACKING AIR CARGO

TECHNICAL FIELD

The present disclosure relates to a device and method for tracking air cargo, and more particularly, to a device and method for tracking air cargo, which tracks transport-related information, such as a location and altitude of air cargo.

BACKGROUND ART

A container is used to efficiently and economically transport cargo. The container is transported through means of transportation, such as a vehicle, a ship, or an airplane, after the cargo held in a pallet is loaded onto the container.

The container is left in a port, a warehouse, etc. for a long period or left or used within means of transportation for a long period before the container is loaded onto the means of transportation. Accordingly, an accident, such as the theft of cargo loaded onto the container or the addition of illegal cargo, frequently occurs.

Accordingly, in order to safely transport cargo, an asset tracking technology for installing various sensors at transport structures, such as a container and a pallet, and transmitting sensing information and location information sensed in the transport structures to a management server is applied.

The asset tracking technology uses a communication network in order to transmit the sensing information sensed in the transport structure to the management server. In this case, low power wide area (LPWA) communication, such as Sigfox, LoRa, NB-IoT, and LTE-CAT.M1, is used in the asset tracking technology.

In the asset tracking technology, an asset tracker including various sensors and communication modules is installed in the container.

However, in order to secure the stability of airline operations, communication of the asset tracker needs to be stopped before the airplane takes off and to be operated again when the airplane lands because the communication cannot be used during operations.

Accordingly, a conventional asset tracker has problems in that a lot of time is taken in a loading process and an airplane operation schedule is disrupted due to some omission because communication is manually stopped.

DISCLOSURE

Technical Problem

The present disclosure is proposed to solve the conventional problems, and an object of the present disclosure is to provide a device and method for tracking air cargo, wherein whether air cargo has been loaded is determined based on sensed values of a pressure sensor and an accelerometer, and communication with an external device is blocked by changing a mode into a flight mode when loading is completed.

Technical Solution

In order to achieve the object, a device for tracking air cargo according to an embodiment of the present disclosure includes a sensor unit configured to sense acceleration information and pressure information based on a movement of air cargo, a tracking unit configured to generate tracking information of the air cargo based on the information sensed by the sensor unit, and a communication unit configured to transmit, to an external device, the tracking information generated by the tracking unit, wherein the tracking unit stops the communication unit by changing its mode into a flight mode based on one of the information sensed by the sensor unit and whether the communication unit receives a signal.

In order to achieve the object, a method of tracking air cargo according to an embodiment of the present disclosure includes steps of tracking an indoor movement, outdoor movement, and up and down movement of air cargo based on acceleration information and pressure information based on a movement of the air cargo, determining whether the air cargo is loaded onto an airplane based on tracking information in the tracking step, determining whether a door of a cargo compartment has been opened or closed based on one of whether a communication signal has been received and a change in a quantity of light when determining the loading to be loading of the air cargo onto the airplane in the step of determining whether the air cargo is loaded, and changing a mode into a flight mode when determining a state of the door of the cargo compartment to be a closed state in the step of determining whether the door of the cargo compartment has been opened or closed.

Advantageous Effects

According to the present disclosure, the device and method for tracking air cargo can minimize the time taken to load air cargo and minimize a change in an airplane operation schedule attributable to human errors by determining an open or closed state of the door of a cargo compartment based on a sensed value of the sensor unit and changing a mode into a flight mode when the door of the cargo compartment is closed.

MODE FOR INVENTION

Hereinafter, the most preferred embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it Referring to FIGS. 1 and 2, the device for tracking air cargo according to an embodiment of the present disclosure collects tracking information related to a movement and loading of air cargo. The device for tracking air cargo transmits the collected tracking information to an external device in a given period or when a specific event occurs. In this case, the device for tracking air cargo stops the transmission of the tracking information according to criteria set for each country for safe operations of an airplane.

Figure 1:
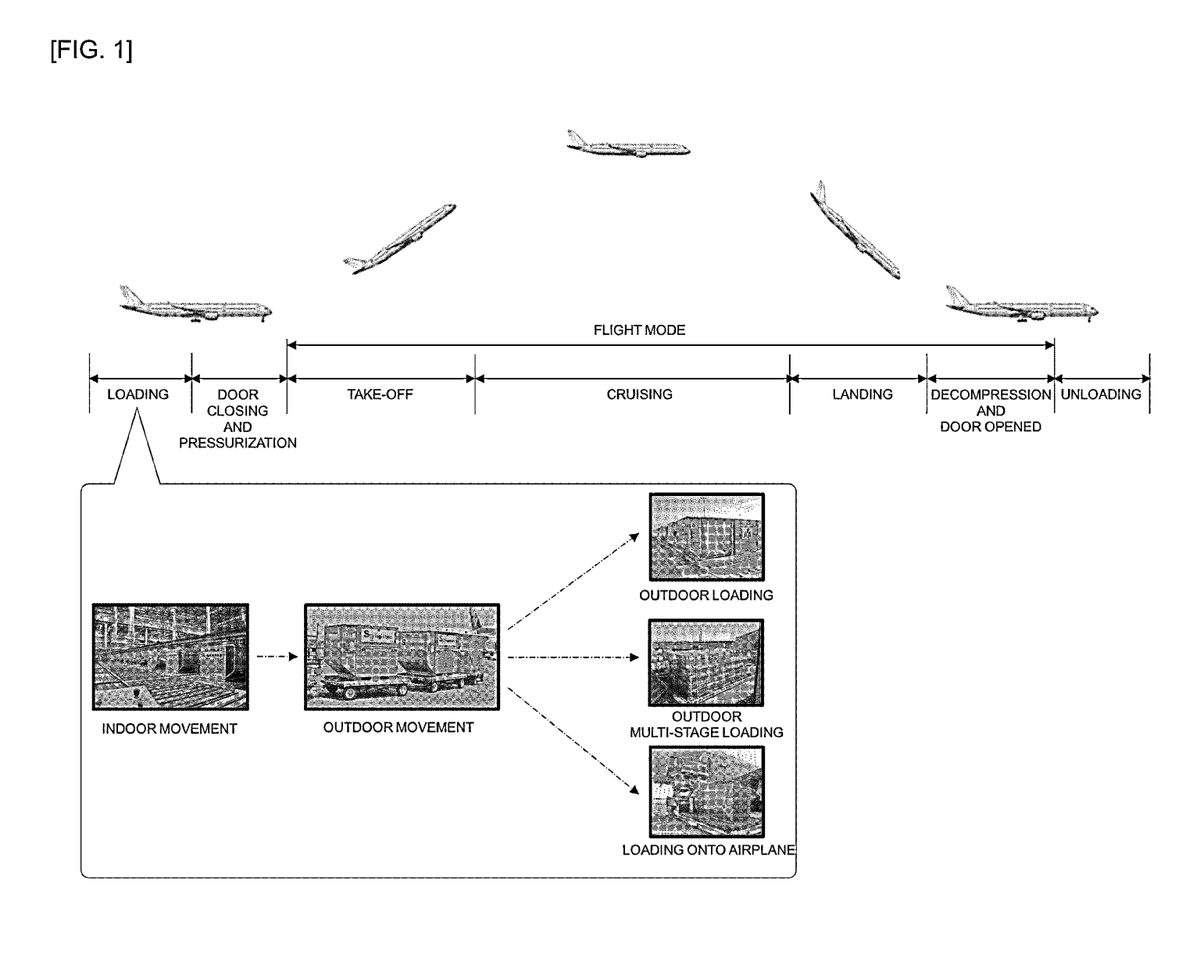
FIG. 1 is a diagram for describing a device for tracking air cargo according to an embodiment of the present disclosure.
Figure 2:
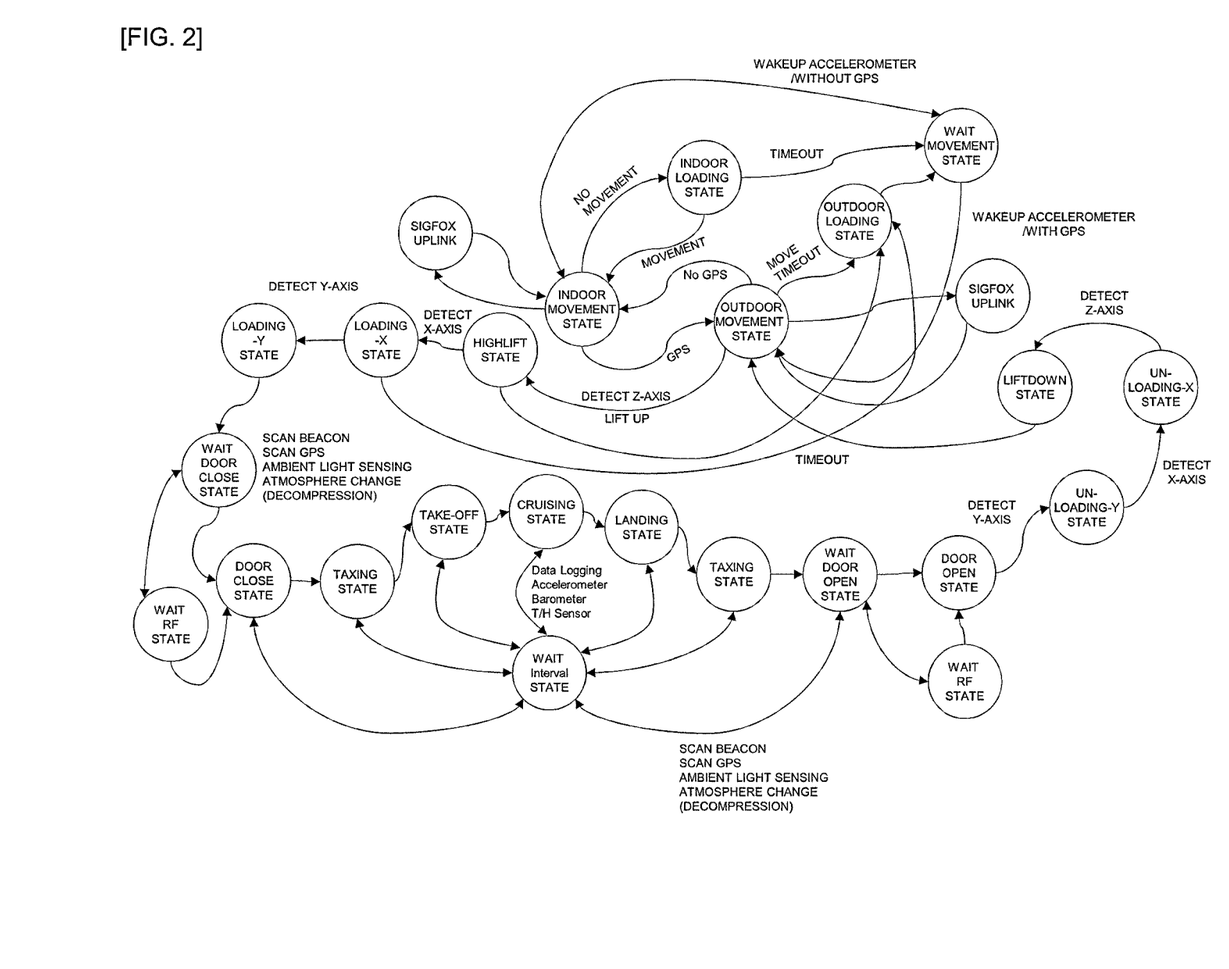
FIG. 2 is a state diagram for describing the device for tracking air cargo according to an embodiment of the present disclosure.

The device for tracking air cargo tracks an indoor movement of the air cargo based on a beacon signal. The device for tracking air cargo determines the movement to be an indoor movement of the air cargo when a location information signal is not received and a beacon signal is received. In this case, the device for tracking air cargo receives the beacon signal from a beacon installed within the interior through an IoT communication module, such as Sigfox.

When the movement is determined to be an indoor movement, the device for tracking air cargo sets a reference location based on a beacon signal. The device for tracking air cargo senses a movement, a direction, and a stop through sensors, such as an accelerometer and a gyroscope. The device for tracking air cargo tracks a location of the air cargo along the indoor movement by using the sensed information. At this time, when a stop is sensed for a set time or more, the device for tracking air cargo determines the stop to be the indoor loading of the air cargo. When determining the stop to be the indoor loading of the air cargo, the device for tracking air cargo changes its mode into a power saving mode until a next movement is sensed.

The device for tracking air cargo tracks an outdoor movement of the air cargo based on a location information signal and a beacon signal. When receiving the location information signal and the beacon signal, the device for tracking air cargo determines the movement to be an outdoor movement of the air cargo. In this case, the device for tracking air cargo receives at least one of location information signals, such as a GPS signal, a GNSS signal, and a QZSS signal.

When determining the movement to be the outdoor movement, the device for tracking air cargo tracks a location of the air cargo along the outdoor movement based on the location information signal, such as a GPS signal, a GNSS signal, or a QZSS signal. In this case, if the outdoor movement of the air cargo is tracked using the location information signal, power consumption is increased. Accordingly, the device for tracking air cargo sets a reference location based on a location information signal or a beacon signal, and changes a mode of a location information collection module into the power saving mode.

The device for tracking air cargo may track a ground movement of the air cargo by using a relative location estimation (PDR) algorithm along with tracking based on a location information signal. In this case, the device for tracking air cargo tracks a location of the air cargo by intelligently applying an inertia sensor-based algorithm for pedestrian dead reckoning (PDR).

The device for tracking air cargo calculates a relative location based on data collected by an inertia sensor in order to maintain accuracy, and then corrects the location again at set time intervals in order to obtain an absolute location based on a location information signal.

Accordingly, the device for tracking air cargo can minimize power consumption and maximize an operation time because location information signal reception modules, such as a GPS module, a GNSS module, and a QZSS module, can be maintained in the power saving mode.

The device for tracking air cargo senses a movement, direction, and stop of air cargo through sensors, such as an accelerometer and a gyroscope. The device for tracking air cargo tracks a location of the air cargo along an outdoor movement based on the sensed information. In this case, when a stop is sensed for a set time or more, the device for tracking air cargo determines the stop to be the outdoor loading of the air cargo. When determining the stop to be the outdoor loading of the air cargo, the device for tracking air cargo changes its mode into the power saving mode until a next movement is sensed.

The device for tracking air cargo tracks an up and down movement of the air cargo. The device for tracking air cargo senses the up and down movement of the air cargo based on a sensed value of a pressure sensor.

At this time, when a stop is sensed for a set time or more through sensors, such as an accelerometer and a gyroscope, the device for tracking air cargo determines the stop to be outdoor multi-stage loading. When determining the stop to be the outdoor multi-stage loading, the device for tracking air cargo changes its mode into the power saving mode until a next movement is sensed.

If a movement direction sensed through the sensors, such as the accelerometer and the gyroscope, is an in-flight length direction or an in-flight-perpendicular direction, the device for tracking air cargo determines the movement direction to be the loading of the air cargo onto an airplane.

When determining the movement direction to be the loading of the air cargo onto the airplane, the device for tracking air cargo determines an open or closed state of the door of a cargo compartment of the airplane.

The device for tracking air cargo may determine the open or closed state of the door of the cargo compartment based on whether an IoT signal and a location information signal have been received. When the IoT signal, such as a Sigfox signal, and the location information signal, such as a GPS signal, a GNSS signal, or a QZSS signal, are not received, the device for tracking air cargo determines a state of the door of the cargo compartment to be the closed state.

The device for tracking air cargo may determine the open or closed state of the door of the cargo compartment based on a sensed value of an ambient light sensor. The device for tracking air cargo determines the open or closed state of the door of the cargo compartment by sensing a change in the quantity of light based on the sensed value of the ambient light sensor.

When determining the state of the door of the cargo compartment to be the closed state, the device for tracking air cargo changes its mode into a flight mode. In this case, the flight mode means a mode in which communication of the device for tracking air cargo is stopped. The device for tracking air cargo stops the transmission of tracking information to an external device.

In this case, the device for tracking air cargo may sense a pressurized state of the cargo compartment before the change into the flight mode. That is, the device for tracking air cargo may sense the pressurized state prior to take-off within the cargo compartment through the pressure sensor before the change into the flight mode because the closing of the door of the cargo compartment was sensed.

After the change into the flight mode, the device for tracking air cargo activates a sensing mode. The device for tracking air cargo stops the communication module, and generates and stores tracking information of the air cargo by activating sensors, such as the accelerometer, the gyroscope, and the pressure sensor. At this time, the device for tracking air cargo may change a mode of location information collection modules into the power saving mode.

The device for tracking air cargo determines whether the airplane takes off or lands based on a sensed value of a sensor. The device for tracking air cargo determines whether the airplane takes off or lands based on sensed values of the accelerometer and the pressure sensor.

In this case, when determining that the airplane lands, the device for tracking air cargo may sense a pressurized state of the cargo compartment. That is, when determining that the airplane lands, the device for tracking air cargo may sense a decompression state within the cargo compartment after landing through the pressure sensor.

After sensing the landing of the airplane, when determining a state of the door of the cargo compartment to be the open state, the device for tracking air cargo releases the flight mode and resumes communication with an external device. In this case, the device for tracking air cargo checks a country based on a beacon signal, and sets, as an IoT communication frequency, a frequency set in the corresponding country. The device for tracking air cargo transmits tracking information, collected after a change into the sensing mode, to the external device through the set IoT communication frequency.

When determining that the airplane takes off, the device for tracking air cargo changes its mode into the flight mode, and may stop communication with an external device. After the mode is changed into the flight mode, the device for tracking air cargo collects tracking information by activating the sensing mode. When determining that the airplane lands, the device for tracking air cargo releases the flight mode and transmits, to an external device, the tracking information collected by the sensing mode.

Figure 3:
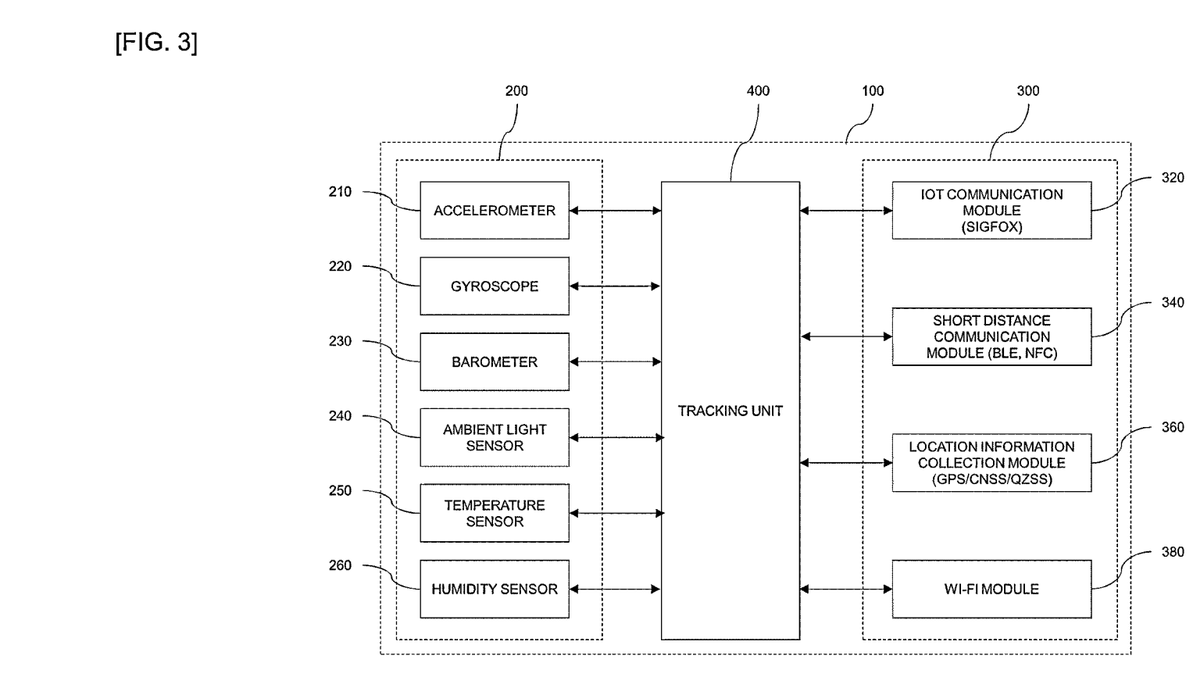
FIG. 3 is a block diagram for describing a configuration of the device for tracking air cargo according to an embodiment of the present disclosure.

Referring to FIG. 3, the device 100 for tracking air cargo according to an embodiment of the present disclosure is configured to include a sensor unit 200, a tracking unit 400, and a communication unit 300.

The sensor unit 200 senses a variety of types of information for tracking air cargo and determining whether an airplane takes off or lands. To this end, the sensor unit 200 is configured to include an accelerometer 210, a gyroscope 220, a pressure sensor 230, an ambient light sensor 240, a temperature sensor 250, a humidity sensor 260, etc.

The accelerometer 210 senses acceleration information based on a movement of air cargo. In this case, the acceleration information may include straight acceleration, angular acceleration, etc., and is information for determining sleep, wakeup, a free fall, or an accident of the device 100 for tracking air cargo, whether an airplane takes off or lands, etc.

The gyroscope 220 senses angular speed information based on a movement of air cargo. In this case, like the acceleration information, the angular speed information is information for determining sleep, wakeup, a free fall, or an accident of the device 100 for tracking air cargo, whether an airplane takes off or lands, etc.

In FIG. 2, the sensor unit 200 has been illustrated as including both the accelerometer 210 and the gyroscope 220, but may include one of the accelerometer 210 and the gyroscope 220.

The pressure sensor 230 senses atmospheric information based on an up and down movement of air cargo. In this case, the atmospheric information is information for determining whether the air cargo is lifted off, a loading height of the air cargo, sensing the opening or closing of the door of a cargo compartment of an airplane, whether the airplane takes off or lands, etc.

The ambient light sensor 240 senses information on the quantity of light within a space where air cargo has been loaded. The ambient light sensor 240 senses information on the quantity of light within a space where air cargo has been loaded, such as an outdoor loading space, an indoor loading space, or a cargo compartment of an airplane. In this case, the information on the quantity of light is information for determining whether the door of the cargo compartment of the airplane has been opened or closed.

The temperature sensor 250 senses a temperature within a space where air cargo has been loaded. The temperature sensor 250 senses a temperature within a space where air cargo has been loaded, such as an outdoor loading space, an indoor loading space, a cargo compartment of an airplane.

The humidity sensor 260 senses humidity within a space where air cargo has been loaded. The humidity sensor 260 senses humidity within a space where air cargo has been loaded, such as an outdoor loading space, an indoor loading space, or a cargo compartment of an airplane.

The communication unit 300 transmits, to an external device, tracking information generated by the tracking unit 400. To this end, the communication unit 300 may be configured to include an IoT communication module 320, a short distance communication module 340, a location information collection module 360, etc.

The IoT communication module 320 transmits essential information of tracking information to an external device. A Sigfox module is taken as an example of the IoT communication module 320. In this case, the IoT communication module 320 is one of Sigfox RCZ 1/2/3/4/5/6 & Monarch, and may transmit the essential information through a Monarch beacon scan (Monarch signal).

The short distance communication module 340 transmits tracking information to an external device. NFC or BLE is taken as an example of the short distance communication module 340. The short distance communication module 340 transmits tracking information corresponding to approximately 32 bytes/8192 times. BLE is based on Bluetooth 5.0, and may perform functions, such as OTA, P2P, and beacon advertising. NFC is based on a dynamic NFC tag, and may perform functions, such as the activation/deactivation, history dump, and a scenario change of the device 100 for tracking air cargo.

The location information collection module 360 is a module for receiving location information, and includes one of a GPS module, a GNSS module, and a QZSS module. In this case, the location information includes latitude and longitude. In this case, the location information collection module 360 includes a position tracking smart sensor. The position tracking smart sensor calculates a relative location from a location finally identified in the location information collection module 360. Accordingly, the location information collection module 360 may analyze a movement pattern (x, y, z) of air cargo.

The communication unit 300 may further include a Wi-Fi module 380 in order to obtain location information of air cargo. The Wi-Fi module 380 obtains location information of air cargo through Wi-Fi sniffing or a Wi-Fi positioning system (WPS). In this case, the Wi-Fi module 380 may transmit tracking information to an external device.

Figure 4:
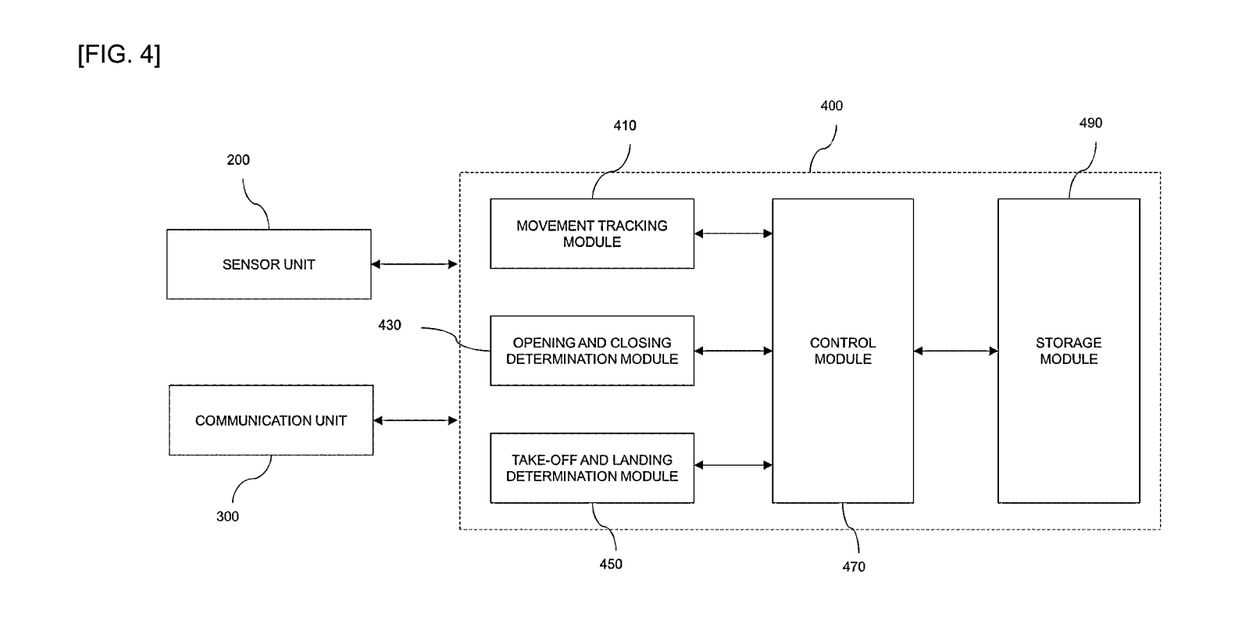
FIG. 4 is a block diagram for describing a configuration of a tracking unit of FIG. 3.

The tracking unit 400 tracks air cargo based on information sensed by the sensor unit 200. Referring to FIG. 4, the tracking unit 400 may be configured to include a movement tracking module 410, an opening and closing determination module 430, a take-off and landing determination module 450, a control module 470, and a storage module 490.

The movement tracking module 410 generates tracking information according to a movement of air cargo. The movement tracking module 410 generates tracking information by tracking an indoor movement, outdoor movement, and up and down movement of air cargo.

The movement tracking module 410 tracks a movement of air cargo based on acceleration information of the accelerometer. In this case, when a change in an X-axis direction or a Y-axis direction is sensed while a Z-axis (height) direction remains constant, the movement tracking module 410 determines the movement of the air cargo to be a horizontal movement. When a change in the Z-axis direction is sensed while the X-axis direction and the Y-axis direction remain constant, the movement tracking module 410 determines the movement of the air cargo to be an up and down movement.

In this case, the up and down movement of the air cargo occurs upon multi-stage loading or movement based on lift for loading onto an airplane. Accordingly, after the movement of the air cargo is determined to be the up and down movement, when a change in the X-axis direction or the Y-axis direction is sensed while the Z-axis direction remains constant, the movement tracking module 410 determines the movement to be the loading of the air cargo onto the airplane. After the movement is determined to be the up and down movement, when the X-axis direction, the Y-axis direction, and the Z-axis direction remain constant, the movement tracking module 410 determines a movement to be the multi-stage loading of the air cargo.

The movement tracking module 410 generates tracking information by tracking an indoor movement of air cargo. The movement tracking module 410 tracks an indoor movement of air cargo based on a beacon signal. The movement tracking module 410 determines a movement of the air cargo to be an indoor movement when a location information signal is not received and a beacon signal is received.

When the movement is determined to be the indoor movement, the movement tracking module 410 sets a reference location based on a beacon signal. The movement tracking module 410 senses a movement, a direction, and a stop through sensors, such as the accelerometer 210 and the gyroscope 220. The movement tracking module 410 tracks a location of air cargo along an indoor movement by using the sensed information. At this time, when a stop is sensed for a set time or more, the movement tracking module 410 determines the stop to be the indoor loading of the air cargo.

The movement tracking module 410 generates tracking information by tracking an outdoor movement of air cargo. The movement tracking module 410 tracks an outdoor movement of air cargo based on a location information signal and a beacon signal. When a location information signal and a beacon signal are received, the movement tracking module 410 determines a movement to be an outdoor movement of air cargo. In this case, the movement tracking module 410 receives at least one of location information signals, such as a GPS signal, a GNSS signal and a QZSS signal.

When determining the movement to be the outdoor movement of the air cargo, the movement tracking module 410 tracks a location of the air cargo along the outdoor movement based on a location information signal, such as a GPS signal, a GNSS signal, or a QZSS signal. In this case, if the outdoor movement of the air cargo is tracked based on the location information signal, power consumption is increased. Accordingly, the movement tracking module 410 sets a reference location and changes a mode of a location information reception module into the power saving mode based on the location information signal or a beacon signal.

The movement tracking module 410 may track a ground movement of air cargo by using a relative location estimation (PDR) algorithm along with tracking based on a location information signal. In this case, the movement tracking module 410 tracks a location of the air cargo by intelligently applying an inertia sensor-based algorithm for pedestrian dead reckoning (PDR).

The movement tracking module 410 calculates a relative location based on data collected by the inertia sensor in order to maintain accuracy, and then corrects the location again at set time intervals in order to obtain an absolute location based on a location information signal.

Accordingly, the movement tracking module 410 can minimize power consumption and maximize an operation time because the location information signal reception module can be maintained in the power saving mode.

The movement tracking module 410 senses a movement, a direction, and a stop through sensors, such as the accelerometer 210 and the gyroscope 220. The movement tracking module 410 tracks a location of air cargo based on an outdoor movement by using the sensed information. At this time, when a stop is sensed for a set time or more, the movement tracking module 410 determines the stop to be the outdoor loading of the air cargo. When determining the stop to be the outdoor loading of the air cargo, the movement tracking module 410 changes its mode into the power saving mode until a next movement is sensed.

The movement tracking module 410 generates tracking information by tracking an up and down movement of air cargo. The movement tracking module 410 senses an up and down movement of air cargo based on a sensed value of the pressure sensor 230.

At this time, when a stop is sensed for a set time or more through a sensor, such as the accelerometer 210 or the gyroscope 220, the movement tracking module 410 determines the stop to be outdoor multi-stage loading. When determining the stop to be the outdoor multi-stage loading, the movement tracking module 410 changes its mode into the power saving mode until a next movement is sensed.

If a movement direction sensed by a sensor, such as the accelerometer 210 or the gyroscope 220, is an in-flight length direction or an in-flight-perpendicular direction, the movement tracking module 410 determines such a movement to be the loading of air cargo onto an airplane.

The opening and closing determination module 430 determines whether the door of a cargo compartment of an airplane onto which air cargo has been loaded has been opened or closed. When the loading of the air cargo onto the airplane is determined by the movement tracking module 410, the opening and closing determination module 430 determines an open or closed state of the door of the cargo compartment of the airplane. The opening and closing determination module 430 may determine the open or close state of the door of the cargo compartment based on whether the communication unit 300 has received an IoT signal and a location information signal. When the IoT signal, such as a Sigfox signal, and the location information signal, such as a GPS signal, a GNSS signal, or a QZSS signal, are not received, the opening and closing determination module 430 determines a state of the door of the cargo compartment to be the closed state.

The opening and closing determination module 430 may determine the open or closed state of the door of a cargo compartment based on a sensed value of the ambient light sensor 240. The opening and closing determination module 430 determines the open or closed state of the door of the cargo compartment by sensing a change in the quantity of light based on a sensed value of the ambient light sensor 240. When the sensed value of the ambient light sensor 240 is equal to or less than a reference value, the opening and closing determination module 430 determines a state of the door of the cargo compartment to be the closed state. When the sensed value of the ambient light sensor 240 is greater than the reference value, the opening and closing determination module 430 determines a state of the door of the cargo compartment to be the open state.

The take-off and landing determination module 450 determines whether an airplane takes off or lands based on sensing information of the sensor unit 200. The take-off and landing determination module 450 determines whether the airplane takes off or lands based on sensed values of the accelerometer 210 and the pressure sensor 230.

Figure 5:
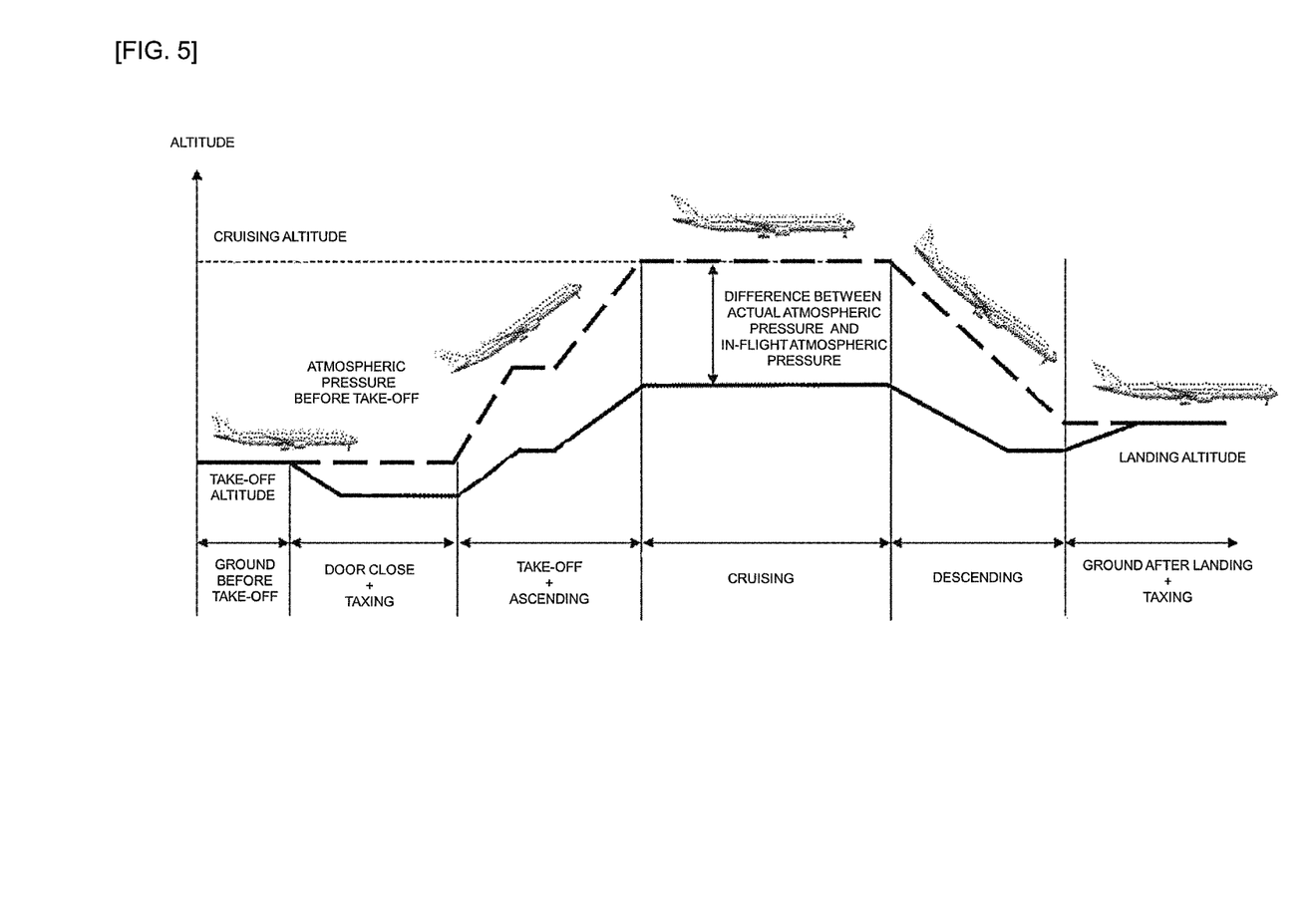
FIG. 5 is a diagram for describing a take-off and landing determination module of FIG. 4.

For example, referring to FIG. 5, the take-off and landing determination module 450 may calculate altitude based on a change in a pressure value sensed by the pressure sensor and determine an operation state of an airplane, including take-off and landing, based on the altitude. In this case, the take-off and landing determination module 450 may determine the operation state of the airplane, such as the ground before take-off, door closed and taxing, pressurization, take-off and ascending, cruising, descending, the ground after landing and taxing, or decompression, and unloading.

When the opening and closing determination module 430 determines the state of the door of a cargo compartment to be the closed state, the control module 470 changes a mode into the flight mode. When the mode is changed into the flight mode, the control module 470 stops communication with an external device by changing a mode of the communication unit 300 into the power saving mode.

After the mode is changed into the flight mode, the control module 470 activates the flight mode into the sensing mode. At this time, the control module 470 generates and stores the tracking information of air cargo by activating the sensor unit 200 in the state in which the mode of the communication unit 300 has changed into the power saving mode. At this time, the control module 470 may change a mode of the location information collection module 360 into the power saving mode.

When the take-off and landing determination module 450 senses the landing of the airplane and the opening and closing determination module 430 determines the state of the door of the cargo compartment to be the open state, the control module 470 releases the flight mode and drives the communication unit 300 in order to resume communication with an external device. At this time, the control module 470 transmits, to the external device, tracking information collected after the flight mode is changed into the sensing mode.

The storage module 490 stores tracking information according to a movement of the air cargo. The storage module 490 stores events, such as an indoor movement, indoor loading, an outdoor movement, outdoor loading, and loading onto the cargo compartment. The storage module 490 may further store location information, a movement path, etc. according to each event. The storage module 490 may store the opening and closing of the door of the cargo compartment according to a movement of the air cargo, the take-off and landing of the airplane, etc.

This is an example of the device 100 for tracking air cargo according to an embodiment of the present disclosure. In this case, the device 100 for tracking air cargo is attached to air cargo in a simple attachment manner, such as a screw, and satisfies IP67/IK8 (dust proof and water proof grade (Ingress protection)/shock prevention (Vandal resistance).

The device 100 for tracking air cargo is attached to the front of air cargo, and the height thereof is limited to approximately 15 mm or less in order to prevent damage attributable to a collision while moving. An example of the height of the device is approximately L150×W130×D15 m or L70×W250×D15 mm. The device 100 for tracking air cargo includes an antenna having a patch type in order to prevent the deterioration of antenna sensitivity depending on an aluminum structure of air cargo.

Figure 6:
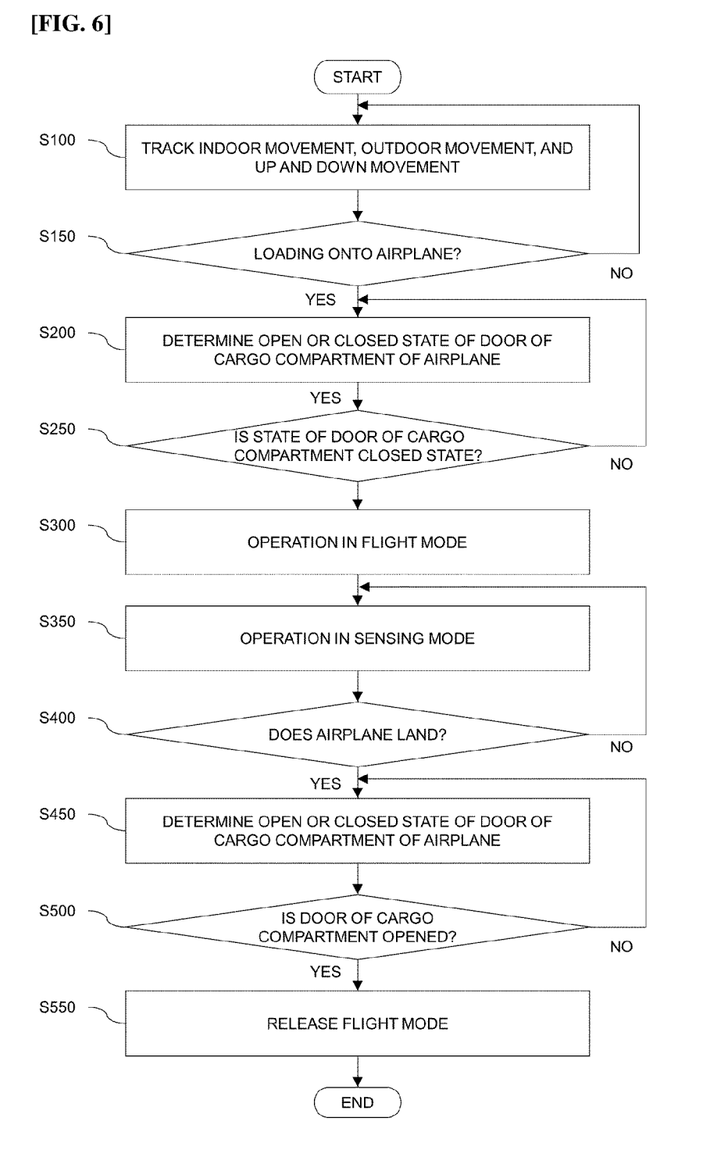
FIG. 6 is a flowchart for describing a method of tracking air cargo according to an embodiment of the present disclosure.

A method of tracking air cargo according to an embodiment of the present disclosure is described below with reference to FIG. 6.

The device 100 for tracking air cargo tracks an indoor movement, outdoor movement, and up and down movement of air cargo (S100). This is described in detail below with reference to the accompanying drawings.

Figure 7:
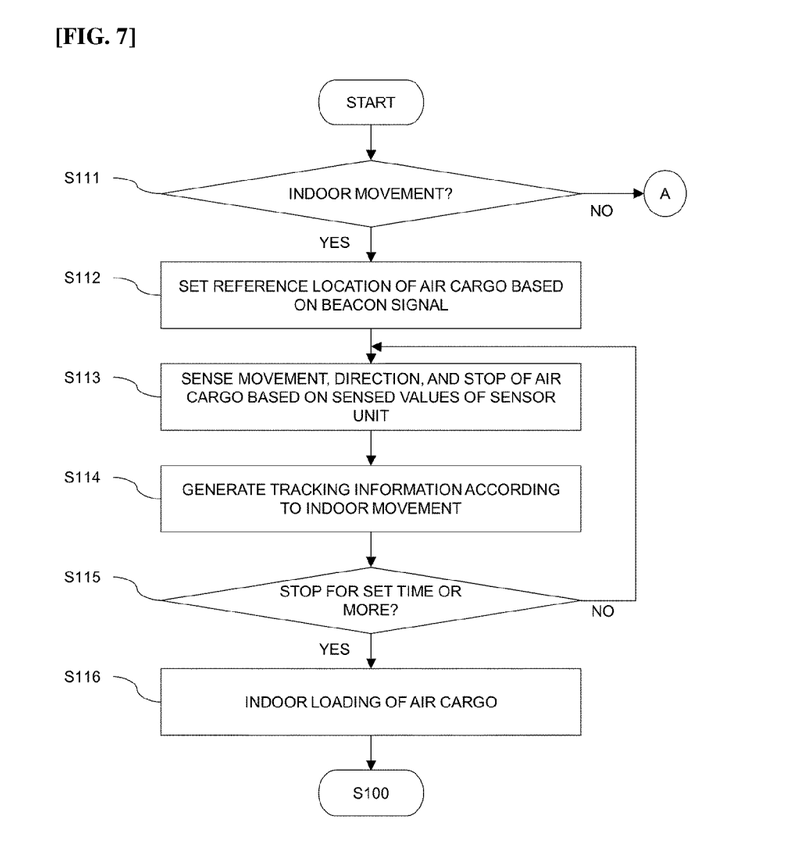
FIGS. 7 and 8 are flowcharts for describing an air cargo tracking step in FIG. 6.
Figure 8:
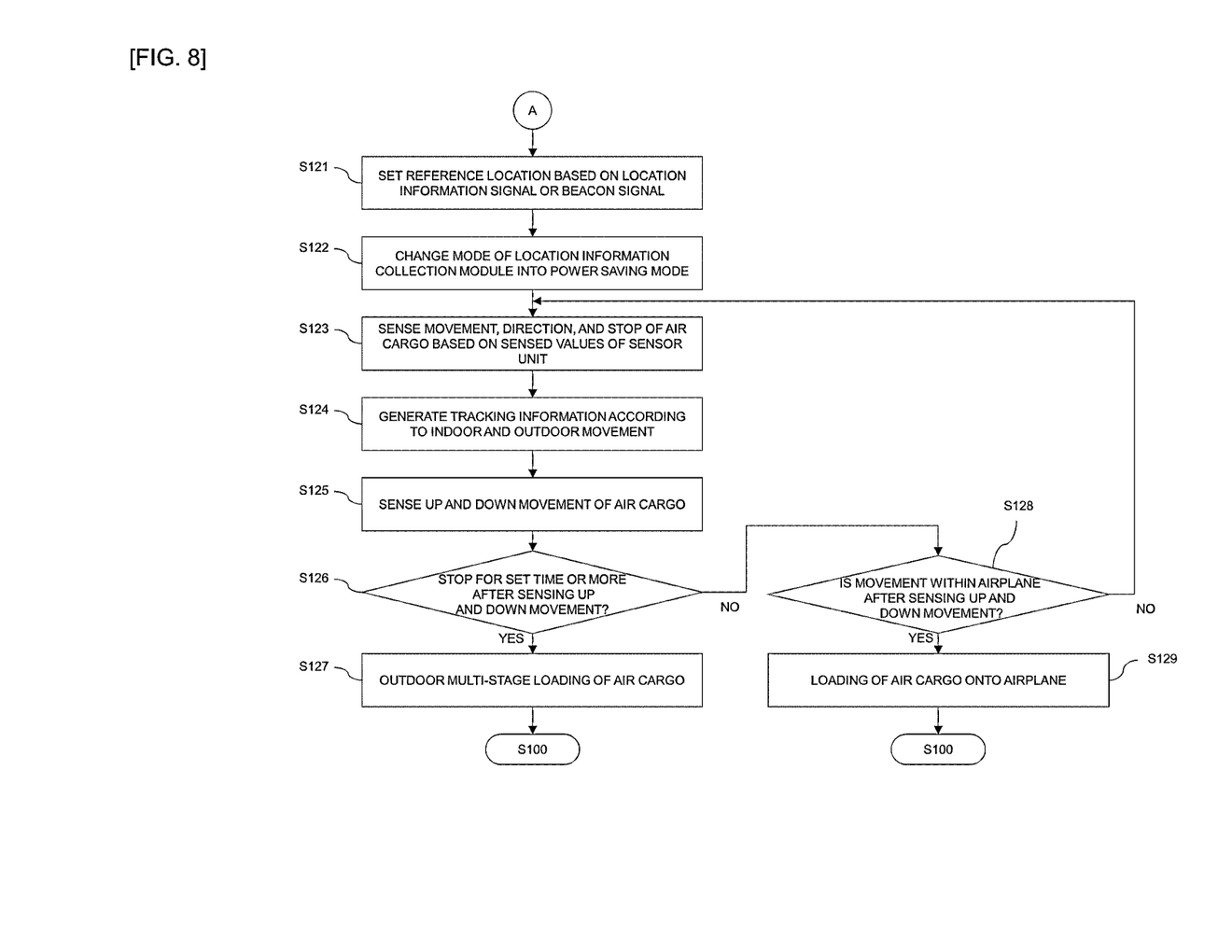

Referring to FIGS. 7 and 8, the device 100 for tracking air cargo determines an indoor movement of the air cargo based on whether a location information signal and a beacon signal have been received. When the location information signal is not received and the beacon signal is received, the device 100 for tracking air cargo determines a movement to be an indoor movement of the air cargo. When the movement is determined to be the indoor movement of the air cargo (S111; Yes), the device 100 for tracking air cargo sets a reference location of the air cargo based on the beacon signal (S112).

The device 100 for tracking air cargo senses a movement, direction, and stop of the air cargo based on sensed values of the sensor unit 200 (S113). In this case, the device 100 for tracking air cargo senses the movement, direction, and stop of the air cargo based on information sensed by sensors, such as the accelerometer 210 and the gyroscope 220.

The device 100 for tracking air cargo generates tracking information according to the indoor movement of the air cargo based on the sensed values of the sensor unit 200 (S114).

When the air cargo maintains a stop state for a set time or more (S115; Yes), the device 100 for tracking air cargo determines the stop to be the indoor loading of the air cargo (S116). When the stop is determined to be the indoor loading, the device 100 for tracking air cargo changes its mode into the power saving mode until a next movement is sensed.

When a movement is determined to be an outdoor movement of the air cargo because the location information signal and the beacon signal are received in step S111, the device 100 for tracking air cargo sets a reference location of the air cargo based on the location information signal or the beacon signal (S121).

The device 100 for tracking air cargo changes a mode of the location information collection module 360 into the power saving mode (S122). That is, if the outdoor movement of the air cargo is tracked using the location information signal, power consumption is increased. Accordingly, the device 100 for tracking air cargo sets the reference location based on the location information signal or the beacon signal and changes the mode of the location information collection module 360 into the power saving mode.

The device 100 for tracking air cargo senses a movement, direction, and stop of the air cargo based on sensed values of the sensor unit 200 (S123). In this case, the device 100 for tracking air cargo senses the movement, direction, and stop of the air cargo based on information sensed by sensors, such as the accelerometer 210 and the gyroscope 220.

The device 100 for tracking air cargo may track a location of the air cargo according to the outdoor movement based on a location information signal, such as an air cargo GPS signal, a GNSS signal, or a QZSS signal. In this case, the device 100 for tracking air cargo tracks the outdoor movement of the air cargo by using a relative location estimation (PDR) algorithm along with the tracking based on the location information signal. In this case, the device 100 for tracking air cargo tracks the location of the air cargo by intelligently applying an inertia sensor-based algorithm for pedestrian dead reckoning (PDR). The device 100 for tracking air cargo calculates a relative location based on data collected by the inertia sensor in order to maintain accuracy, and then corrects the location again at set time intervals in order to obtain an absolute location through the location information signal. Accordingly, the device 100 for tracking air cargo can minimize power consumption and maximize an operation time because the location information signal reception modules, such as a GPS module, a GNSS module, and a QZSS module, can be maintained in the power saving mode.

The device 100 for tracking air cargo generates tracking information according to the outdoor movement of the air cargo based on the sensed values of the sensor unit 200 (S124). At this time, the device 100 for tracking air cargo senses an up and down movement of the air cargo based on the sensed values of the pressure sensor 230.

The device 100 for tracking air cargo senses the up and down movement of the air cargo during the outdoor movement (S125). The device 100 for tracking air cargo senses the up and down movement of the air cargo based on the sensed values of the pressure sensor 230.

When a stop state is maintained for a set time or more after the up and down movement of the air cargo is sensed (S126; Yes), the device 100 for tracking air cargo determines the stop to be the outdoor multi-stage loading of the air cargo (S127). When the stop is determined to be the outdoor multi-stage loading, the device 100 for tracking air cargo changes its mode into the power saving mode until a next movement is sensed.

When a movement within an airplane is sensed after the up and down movement of the air cargo is sensed (S128; Yes), the device 100 for tracking air cargo determines the movement to be the loading of the air cargo onto the airplane (S129). That is, when a movement direction sensed through a sensor, such as the accelerometer 210 or the gyroscope 220, is an in-flight length direction or an in-flight-perpendicular direction, the device 100 for tracking air cargo determines the movement to be the loading of the air cargo onto the airplane.

When the movement is determined to be the loading of the air cargo onto an airplane (S150; Yes), the device 100 for tracking air cargo determines the open or closed state of the door of a cargo compartment of the airplane (S200). The device 100 for tracking air cargo determines the open or closed state of the door of the cargo compartment based on whether an IoT signal and a location information signal have been received. When the IoT signal, such as a Sigfox signal, and the location information signal, such as a GPS signal, a GNSS signal, or a QZSS signal, are not received, the device 100 for tracking air cargo determines a state of the door to be the closed state of the door of the cargo compartment. In this case, the device 100 for tracking air cargo may determine the open or closed state of the door of the cargo compartment based on a sensed value of the ambient light sensor 240. The device 100 for tracking air cargo determines the open or closed state of the door of the cargo compartment by sensing a change in the quantity of light based on the sensed value of the ambient light sensor 240.

When the state of the door of the cargo compartment is determined to be the closed state (S250; Yes), the device 100 for tracking air cargo changes its mode into the flight mode and operates (S300). The device 100 for tracking air cargo stops the transmission of tracking information to an external device by changing the mode into the flight mode in which communication is stopped. In this case, the device 100 for tracking air cargo continues to track the air cargo.

The device 100 for tracking air cargo activates the sensing mode after changing the mode into the flight mode (S350). The device 100 for tracking air cargo generates and stores tracking information of the air cargo by stopping the communication unit 300 and activating the sensor unit 200 including the accelerometer 210, the gyroscope 220, the pressure sensor 230, etc. At this time, the device 100 for tracking air cargo may change a mode of the location information collection module 360 into the power saving mode.

The device 100 for tracking air cargo determines whether the airplane takes off or lands based on sensed values of sensors. The device 100 for tracking air cargo determines whether the airplane takes off or lands based on sensed values of the accelerometer 210 and the pressure sensor 230. When a movement of the airplane is determined to be the landing of the airplane (S400; Yes), the device 100 for tracking air cargo determines the open or closed state of the door of the cargo compartment of the airplane (S450). When an IoT signal, such as a Sigfox signal, and a location information signal, such as a GPS signal, a GNSS signal, or a QZSS signal, are received, the device 100 for tracking air cargo determines a state of the door of the cargo compartment to be the open state. In this case, the device 100 for tracking air cargo may determine the open or closed state of the door of the cargo compartment based on a sensed value of the ambient light sensor 240.

When the state of the door of the cargo compartment is determined to be the open state (S500; Yes), the device 100 for tracking air cargo releases the flight mode (S550). The device 100 for tracking air cargo operates the communication unit 300 by releasing the flight mode, and transmits tracking information to an external device. At this time, the device 100 for tracking air cargo checks a country based on a beacon signal and sets, as an IoT communication frequency, a frequency set in the corresponding country. The device 100 for tracking air cargo transmits, to the external device, the tracking information collected after a change into the sensing mode through the set IoT communication frequency.

Figure 9:
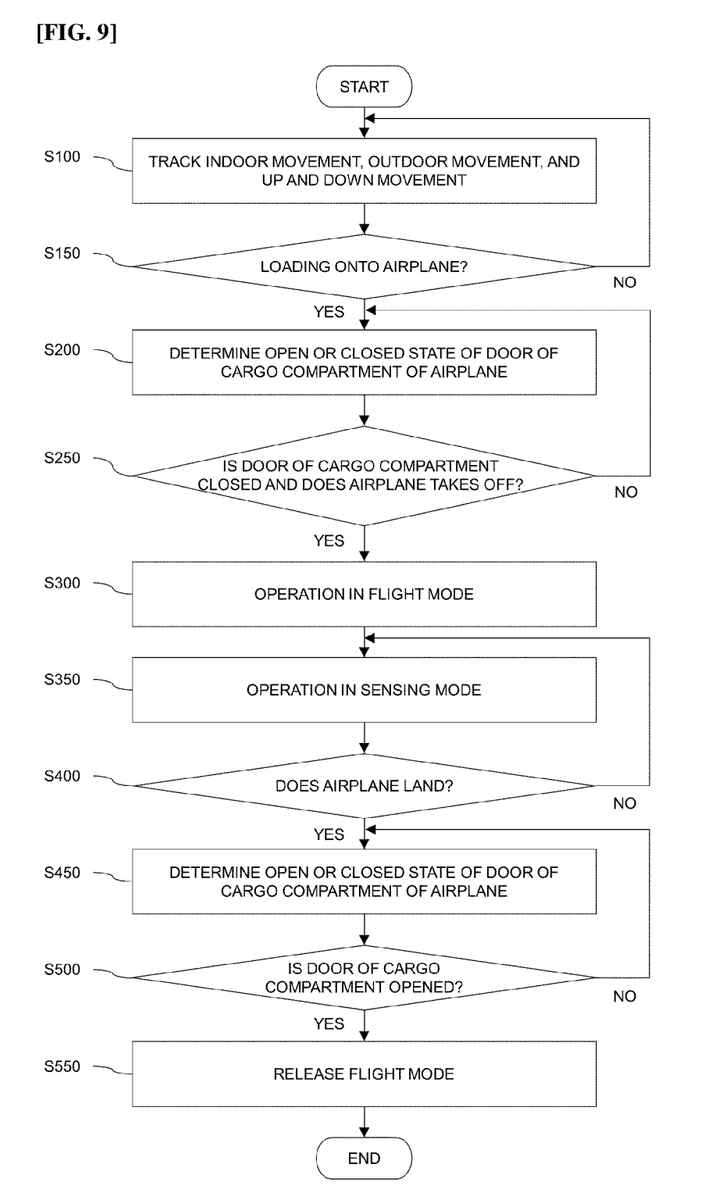
FIG. 9 is a flowchart for describing a modified example of the method of tracking air cargo according to an embodiment of the present disclosure.

Referring to FIG. 9, when a movement of the airplane is determined to be the take-off of the airplane after the door of the cargo compartment is closed in step S250, the device 100 for tracking air cargo may stop communication with the external device by changing its mode into the flight mode.

As described above, although the preferred exemplary embodiment according to the present disclosure has been described, it is understood that changes may be made in various forms, and those skilled in the art may practice various changed examples and modified examples without departing from the claims of the present disclosure.

The invention claimed is:

1. A device for tracking air cargo comprising:
a sensor unit configured to sense acceleration information and pressure information based on a movement of air cargo;
a tracking unit configured to generate tracking information of the air cargo based on the information sensed by the sensor unit; and
a communication unit configured to transmit, to an external device, the tracking information generated by the tracking unit,
wherein the tracking unit stops the communication unit by changing its mode into a flight mode based on one of the information sensed by the sensor unit and whether the communication unit receives a signal,
wherein the sensor unit comprises an ambient light sensor configured to sense a change in the quantity of light in a space where the air cargo is located, and
wherein the tracking unit changes the mode into the flight mode by determining a closed state of a door of a cargo compartment when the change in the quantity of light sensed by the sensor unit is equal to or less than a reference value, after the air cargo is loaded onto an airplane.

2. The device of claim 1,
wherein the tracking unit changes the mode into the flight mode by determining that an airplane takes off based on the pressure information and the acceleration information sensed by the sensor unit.

3. The device of claim 1,
wherein the tracking unit releases the flight mode by determining a state of a door of a cargo compartment to be an open state when the change in the quantity of light sensed by the sensor unit is greater than a reference value, after an airplane onto which the air cargo has been loaded lands.

4. The device of claim 1,
wherein the tracking unit comprises:
a movement tracking module configured to generate tracking information by tracking an indoor movement, outdoor movement, and up and down movement of the air cargo based on the information sensed by the sensor unit;
an opening and closing determination module configured to determine whether a door of a cargo compartment of an airplane has been opened or closed when the movement tracking module determines a movement of the air cargo to be loading of the air cargo onto the airplane;
a take-off and landing determination module configured to determine whether the airplane onto which the air cargo has been loaded takes off or lands based on the acceleration information and the pressure information sensed by the sensor unit; and
a control module configured to set or release the flight mode based on the tracking information generated by the movement tracking module and results of the determination of the opening and closing determination module and the take-off and landing determination module.

5. The device of claim 4,
wherein the movement tracking module determines the movement to be the indoor movement of the air cargo when the communication unit does not receive a location information signal and receives a beacon signal, and determines the movement to be the outdoor movement of the air cargo when the communication unit receives the location information signal and the beacon signal.

6. The device of claim 4,
wherein the movement tracking module determines the movement to be a horizontal movement of the air cargo when a change in an X-axis direction and a Y-axis direction occurs while a Z-axis direction of the acceleration information is maintained, and determines the movement to be the up and down movement of the air cargo when a change in the Z-axis direction occurs while the X-axis direction and Y-axis direction of the acceleration information are maintained.

7. The device of claim 4,
wherein the movement tracking module determines the movement to be the loading of the air cargo onto the airplane when a Z-axis direction is maintained and a change in an X-axis direction and a Y-axis direction occurs, after determining the movement to be the up and down movement.

8. The device of claim 4,
wherein the opening and closing determination module determines a state of the door of the cargo compartment to be a closed state when a change in a quantity of light sensed by the sensor unit is equal to or less than a reference value after the movement tracking module determines the movement to be the loading of the air cargo onto the airplane, and
determines the state of the door of the cargo compartment to be an open state when the change in the quantity of light sensed by the sensor unit is greater than the reference value after the take-off and landing determination module determines that the airplane lands.

9. The device of claim 4,
wherein the control module
changes its mode into a power saving mode by stopping the communication unit when the opening and closing determination module determines the door of the cargo compartment to be closed or the take-off and landing determination module determines that the airplane takes off, and
releases the power saving mode by driving the communication unit again when the take-off and landing determination module determines that the airplane lands and the opening and closing determination module determines that the door of the cargo compartment is opened.

10. The device of claim 1,
wherein the communication unit comprises:
an IoT communication module configured to transmit, to the external device, the tracking information generated by the tracking unit through a beacon; and
a location information collection module configured to collect a location information signal of the air cargo,
wherein the IoT communication module is a SigFox communication module, and
wherein the location information collection module is one of a GPS module, a GNSS module, and a QZSS module.

11. A method of tracking air cargo by using a device for tracking air cargo, comprising steps of:
tracking an indoor movement, outdoor movement, and up and down movement of air cargo based on acceleration information and pressure information based on a movement of the air cargo;

determining whether the air cargo is loaded onto an airplane based on tracking information in the tracking step;

determining whether a door of a cargo compartment has been opened or closed based on one of whether a communication signal has been received and a change in a quantity of light when determining the loading to be loading of the air cargo onto the airplane in the step of determining whether the air cargo is loaded; and changing a mode into a flight mode when determining a state of the door of the cargo compartment to be a closed state in the step of determining whether the door of the cargo compartment has been opened or closed, wherein in the step of determining whether the door of the cargo compartment has been opened or closed, a state of the door of the cargo compartment is determined to be a closed state when a change in a quantity of light is equal to or less than a reference value after the air cargo is loaded onto the airplane.

12. The method of claim 11,
wherein the tracking step comprises:
determining the movement to be a horizontal movement of the air cargo when a change in an X-axis direction and a Y-axis direction occurs while a Z-axis direction of the acceleration information is maintained, and
determining the movement to be the up and down movement of the air cargo when a change in the Z-axis direction occurs while the X-axis direction and Y-axis direction of the acceleration information are maintained.

13. The method of claim 11,
wherein the tracking step comprises:
setting a reference location of the air cargo based on a beacon signal when the movement is determined to be the indoor movement of the air cargo;
sensing a movement, direction, and stop of the air cargo based on the acceleration information and the pressure information;
generating tracking information according to the indoor movement based on information sensed in the sensing step; and
determining the movement to be indoor loading of the air cargo when a stop state for a set time or more is sensed in the sensing step.

14. The method of claim 11, wherein the tracking step comprises:
setting a reference location of the air cargo based on at least one of a location information signal and a beacon signal when the movement is determined to be the outdoor movement of the air cargo;
sensing a movement, direction, and stop of the air cargo based on the acceleration information and the pressure information; and
determining the movement to be loading of the air cargo onto the airplane when a movement within the airplane is sensed after the up and down movement of the air cargo in the sensing step.

15. The method of claim 11,
wherein in the step of determining whether the door has been opened or closed, a state of the door of the cargo compartment is determined to be an open state when the change in a quantity of light is greater than a reference value after the airplane onto which the air cargo has been loaded lands.

16. The method of claim 11, further comprising steps of:
determining whether the airplane lands based on the pressure information after the step of changing into the flight mode; and
releasing the flight mode when determining a movement of the airplane to be the landing of the airplane in the step of determining whether the airplane lands and determining a state of the door of the cargo compartment to be an open state in the step of determining whether the door of the cargo compartment has been opened or closed.

17. The method of claim 11, further comprising steps of:
determining whether the airplane takes off based on the pressure information when determining a movement of the air cargo to be the loading of the air cargo onto the airplane in the step of determining whether the air cargo is loaded onto the airplane; and
changing a mode into the flight mode when determining a movement of the airplane to be the take-off of the airplane in the step of determining whether the airplane takes off.

* * * * *